(12) United States Patent
Seo et al.

(10) Patent No.: US 9,507,753 B2
(45) Date of Patent: *Nov. 29, 2016

(54) COARSE-GRAINED RECONFIGURABLE ARRAY BASED ON A STATIC ROUTER

(71) Applicants: SAMSUNG ELECTRONICS CO., LTD., Suwon-si (KR); Korea Advanced Institute of Science and Technology, Daejeon (KR)

(72) Inventors: Woong Seo, Hwaseong-si (KR); Han-Joon Kim, Daejeon (KR); John Kim, Daejeon (KR); Soo-Jung Ryu, Hwaseong-si (KR)

(73) Assignees: Samsung Electronics Co., Ltd., Suwon-si (KR); Korea Advanced Institute of Science and Technology, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/694,420

(22) Filed: Apr. 23, 2015

(65) Prior Publication Data

US 2015/0227490 A1 Aug. 13, 2015

Related U.S. Application Data

(63) Continuation of application No. 13/645,800, filed on Oct. 5, 2012, now Pat. No. 9,042,392.

(30) Foreign Application Priority Data

Oct. 5, 2011 (KR) .................. 10-2011-0101459

(51) Int. Cl.
*G06F 15/80* (2006.01)
*H04L 12/773* (2013.01)
*H04L 12/721* (2013.01)
*G06F 15/173* (2006.01)
*G06F 9/445* (2006.01)

(52) U.S. Cl.
CPC ........... *G06F 15/80* (2013.01); *G06F 9/44505* (2013.01); *G06F 15/17312* (2013.01); *H04L 45/06* (2013.01); *H04L 45/60* (2013.01)

(58) Field of Classification Search
CPC ....... H04L 65/00; H04L 45/00; H04L 45/02; H04L 45/04; H04L 45/60; H04L 45/58; H04L 45/583; H04L 45/586; H04L 12/66; H04L 2012/46; H04L 12/46; H04L 2012/5618

See application file for complete search history.

(56) References Cited

U.S. PATENT DOCUMENTS 7,239,606 B2 * 7/2007 Gilmour ............. G06F 15/8023
370/222

(Continued)

FOREIGN PATENT DOCUMENTS

| KR | 10-0863080 | 10/2008 |
|---|---|---|
| KR | 10-0948512 | 3/2010 |
| KR | 10-2010-0094211 | 8/2010 |

*Primary Examiner* — Chi H Pham
*Assistant Examiner* — Weibin Huang
(74) *Attorney, Agent, or Firm* — NSIP Law (57) ABSTRACT

Provided is a processor with a data transfer structure that is excellent in performance and efficiency. According to an aspect, the processor may include a plurality of processing elements, a plurality of routers respectively connected to the processing elements, and a plurality of connection links formed between the routers such that data is transferred between the processors via a network.

17 Claims, 7 Drawing Sheets

(56) References Cited

U.S. PATENT DOCUMENTS

| | | | |
|---|---|---|---|
| 7,826,460 B2 * | 11/2010 | Lee | H04L 47/10 370/395.62 |
| 7,831,819 B2 | 11/2010 | Chun et al. | |
| 8,078,835 B2 * | 12/2011 | Yang | G06F 7/57 712/10 |
| 8,270,316 B1 * | 9/2012 | Chang | G06F 15/7825 370/254 |
| 9,042,392 B2 * | 5/2015 | Seo | H04L 45/60 370/401 |
| 2010/0211760 A1 * | 8/2010 | Bernhard | G06F 9/3012 712/204 |

* cited by examiner

COARSE-GRAINED RECONFIGURABLE ARRAY BASED ON A STATIC ROUTER

CROSS-REFERENCE TO RELATED APPLICATION(S)

This application is a Continuation of U.S. patent application Ser. No. 13/645,800 filed on Oct. 5, 2012, which claims the benefit under 35 U.S.C. §119(a) of Korean Patent Application No. 10-2011-0101459, filed on Oct. 5, 2011, in the Korean Intellectual Property Office, the entire disclosure of which is incorporated herein by reference for all purposes.

BACKGROUND

1. Field

The following description relates to a reconfigurable processor and an operand network of the reconfigurable processor.

2. Description of the Related Art

In general, a reconfigurable processing architecture refers to a processor that can change the hardware configuration during processing such that the processor is optimized for a specific task. A processor may process a task in a purely hardware manner, in a purely software manner, or as a combination of both hardware and software.

Processing a certain task as purely hardware has difficulties in efficiently handling modifications or changes made during processing of the task due to the fixed functionality of hardware. On the other hand, processing a certain task as purely software can deal with modifications or changes made during processing of the task, however, a processing speed is greatly reduced in comparison to processing of the task as purely hardware.

The reconfigurable architecture has been designed to acquire the advantages of both hardware processing and software processing. In particular, the reconfigurable architecture has attracted a lot of attention in the field of digital signal processing in which the same tasks are repeatedly executed. An example of a reconfigurable architecture is a Coarse-Grained Array (CGA). A typical CGA includes a plurality of processing units that are connected to each other for data transfer.

Generally, the processing units are directly connected to each other through physical wires. However, the direct connections have a problem in that connection structures increase exponentially as the number of the processing units increases. The increase of connection structures results in an increase of system size and energy consumption.

SUMMARY

In an aspect, there is provided a Coarse-Grained Reconfigurable Array (CGRA) including a plurality of processing elements, a plurality of routers respectively connected to the plurality of processing elements, and a plurality of connection links formed between the plurality of routers.

Each processing element may comprise a function unit configured to perform an arithmetic and/or a logic operation, and a register file configured to store data associated with the arithmetic and/or logic operation.

Each router may receive data from a respective processing element directly connected to the router or from an adjacent router, and transfer the data to the respective processing element or the adjacent router based on predetermined compile information.

Each router may comprise a receiver configured to receive data from a processing element and from an adjacent router, a determining unit configured to determine an output direction of the received data based on the predetermined compile information, and an output unit configured to output the data to the processing element or the adjacent router based on the determined output direction.

The determining unit may comprise a plurality of multiplexers (MUXs) that are scheduled based on the predetermined compile information.

The number of the MUXs may be the same as the number of output directions of the router.

In an aspect, there is provided a Coarse-Grained Reconfigured Array (CGRA) including a plurality of processing elements, a first network comprising a plurality of first routers respectively connected to the plurality of processing elements and a plurality of first connection links through which the plurality of first routers are connected, and a second network formed independently from the first network and comprising a plurality of second routers respectively connected to the plurality of processing elements and a plurality of second connection links through which the plurality of second routers are connected.

Each processing element may comprise a function unit configured to perform an arithmetic and/or a logic operation, and a register file configured to store data related to the arithmetic and/or logic operation.

At least one of a first router and a second router may receive data from a respective processing element connected thereto or from an adjacent router, and transmit the received data to the processing element or to another adjacent router based on predetermined compile information.

Each of the first plurality of routers and the second plurality of routers may comprise a receiver configured to receive data from a respective processing element and from an adjacent router, a determining unit configured to determine an output direction of the received data based on predetermined compile information, and an output unit configured to output the received data to the respective processing element or to the other adjacent router based on the determined output direction.

The determining unit may comprise a plurality of multiplexers that are scheduled based on the predetermined compile information.

The number of the multiplexers for each of the first routers and the second routers may be the same as the number of output directions of data for each respective router.

The first network of routers and the second network of routers may be configured to simultaneously transmit data between at least two processing elements.

In an aspect, there is provided a processor including a plurality of processing elements configured to process data, and at least one network of routers connected to the plurality of processing elements and configured to route data between the processing elements based on compile information.

Each processing element may have a router directly connected thereto.

Each processing element may have multiple routers directly connected thereto.

The at least one network of routers may comprise a plurality of networks of routers which are each configured to independently route data between the plurality of processing elements.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Various examples herein are described with reference to a coarse-grained array, however, the examples herein are not limited to such a processor. For example, the various examples herein may be applied to various types of processors such as a multi-core processor, and the like.

Figure 1:
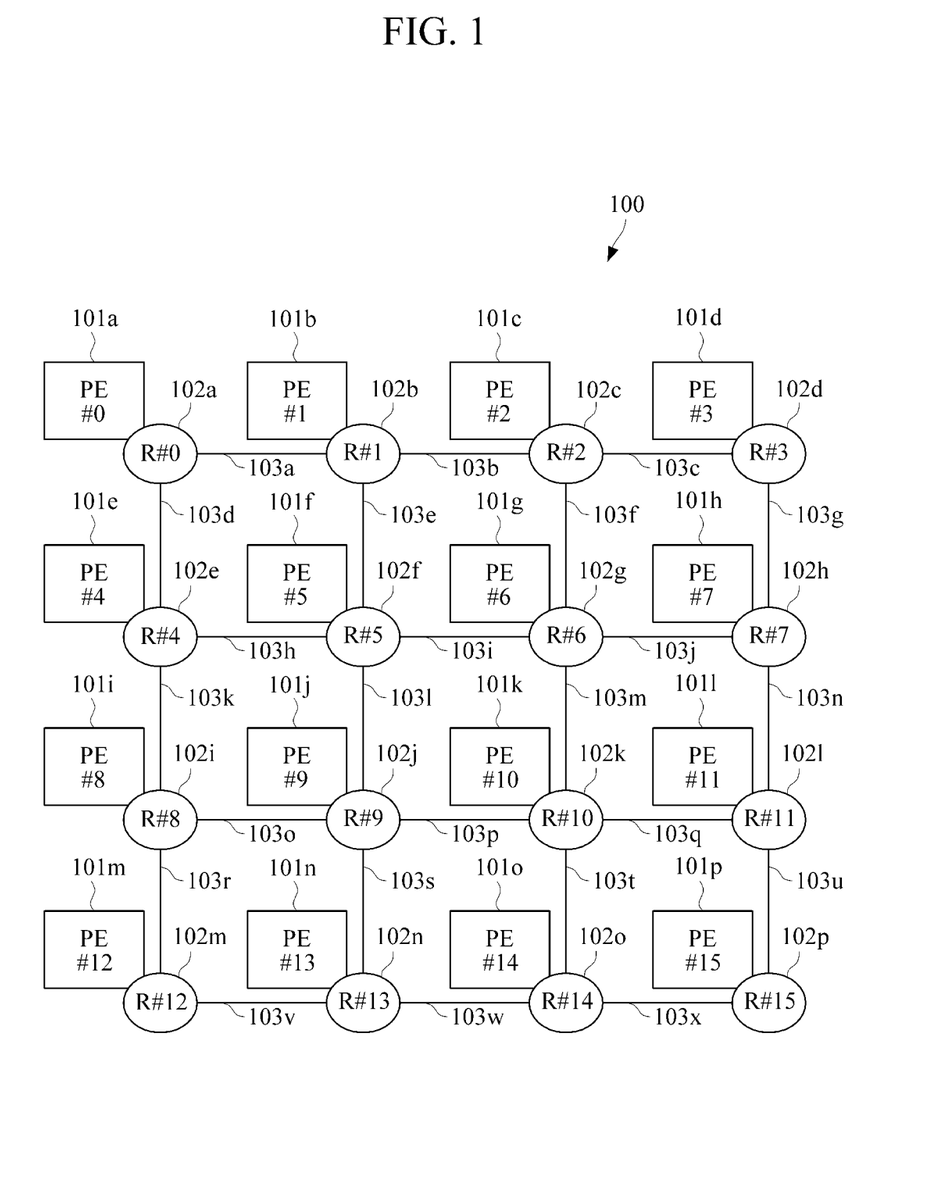
FIG. 1 is a diagram illustrating an example of a Coarse-Grained Reconfigurable Array (CGRA).

FIG. 1 illustrates an example of a Coarse-Grained Reconfigurable Array (CGRA) 100. The CGRA 100 may be included in a terminal, for example, a mobile phone, a computer, a server, a tablet, an appliance, a television, and the like.

Referring to FIG. 1, the CGRA 100 includes a plurality of processing elements 101a through 101p, a plurality of routers 102a through 102 p that are respectively connected to the processing elements 101a through 101p, and a plurality of links 103a through 103x which connect the plurality of routers 102a through 102p.

Each of the processing elements 101a through 101p may independently process an operation or a task. For example, processing elements #0 and #1 (101a and 101b) may simultaneously process (i.e. in parallel) two tasks that have no dependency on each other Each of the processing elements 101a through 101p may include a function unit and a register file. The function unit may perform various arithmetic and logic operations. For example, the function unit may be an Arithmetic Logic Unit (ALU). The register file may store data that is associated with the operation of the function unit. For example, the register file may store operands that are to be input to the function unit and/or the result of operations by the function unit. In some examples, processing elements 101a through 101p may include only a function unit or may include both a function unit and a register file.

The routers 102a through 102p are connected to corresponding processing elements 101a through 101p. For example, router #0 (102a) is connected to processing element #0 (101a) and router #1 is connected to processing element #1 (101b).

In this example, links 103a through 103x connect routers 102a through 102p. For example, router #0 (102a) is connected to router #1 (102b) through link 103a. Links 103a through 103x may be formed with physical wires.

According to an aspect, each router (for example, 102a) may receive data from its respective processing element or from a processing element (for example, 101a) that is directly connected to the router. For example, an input port of router #0 (102a) may be connected to the output port of processing element #0 (101a). In this example, processing element #0 (101a) may output the result of a processing operation, as it is, to router #0 (102a). In other words, processing element 101a may send data to router #0 (102a) without adding separate data such as header information for routing the data.

According to another aspect, each router may receive data from another router (or an adjacent or neighboring router), for example, router #0 102a may receive data from router #4 102e, and vice versa. For example, an input port of router #0 (102a) may be connected to an output port of router #4 (102e). In this example, routers #0 and #4 (102a and 102e) may transfer data without adding separate information such as header information for routing of the data.

A router (for example, 102a) that has received data from a processing element (for example, 101a) or an adjacent router (for example, 102e) may transfer the received data to a processing element 101a or another adjacent router (for example 102b) based on predetermined compile information. In the current example, because the transferred data does not have header information, unlike a general packet, each of the routers 102a through 102p may determine a routing path based on predetermined compile information that is determined during compiling. The compile information may be generated and transmitted to the router from various components, for example, a compiler, a memory, and the like.

As an example, data created by processing element #0 (101a) may be transferred to processing element #5 (101f). For example, operation A may be executed by processing element #0 (101a), and data corresponding to operation A may be created. Processing element #0 (101a) may transfer the created data to its respective router, that is, to router #0 (102a) without adding separate information (for example, header information for routing) to the created data.

Meanwhile, independently from this, router #0 may receive predetermined compile information. The compile information is configuration information that may be generated in response to a code including the operation A being compiled. The configuration information may include information about a location to which the result of the operation A is to be transferred.

Typically, a general router determines a routing path with reference to header information of a received packet and a pre-stored routing table. In the present example, a router may statically determine a routing path based on configuration information that is determined upon compiling, without using header information and/or a routing table. For example, router #0 (102a) that has received data from processing element #0 (101a) may transfer the data to router #1 (102b) based on predetermined compile information. Likewise, router #1 (102b) may transfer the data to router #5 (102f) based on the received compile information, and router #5 (102f) may transfer the data to its respective processing element #5 (101f) based on the compile information.

Figure 2:
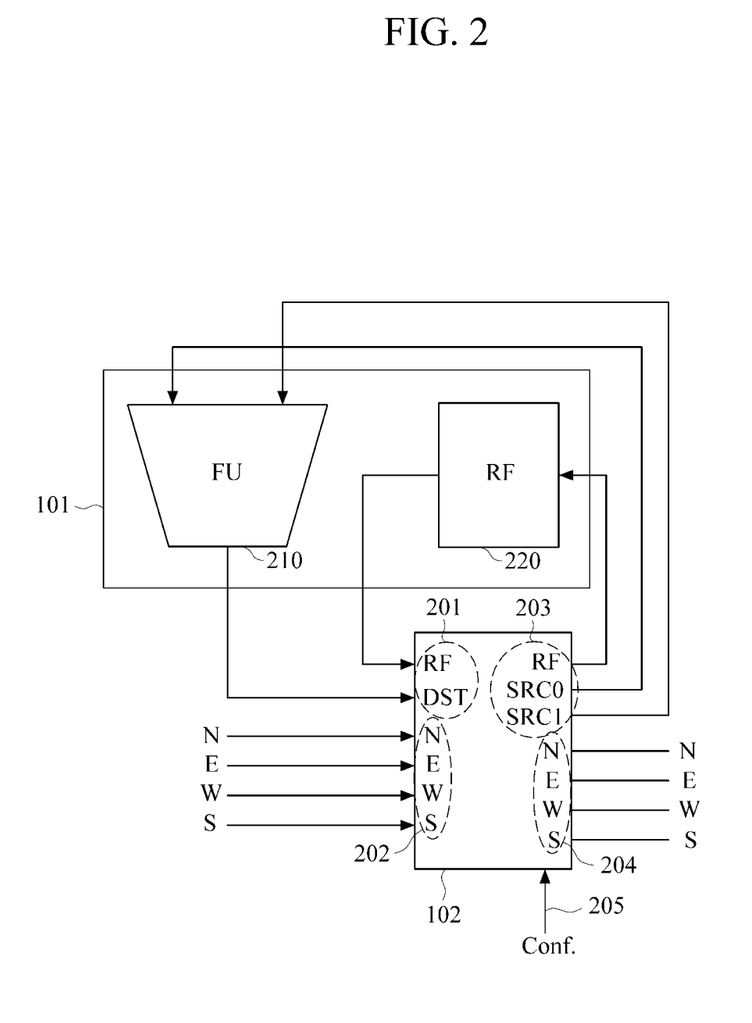
FIG. 2 is a diagram illustrating an example of a connection structure between a processing element and a router.

FIG. 2 illustrates an example of a connection structure between processing element 101 and router 102. In FIG. 2, processing element 101 includes a function unit 210 and a register file 220. The outputs of the function unit 210 and the register file 220 are input to router 102.

In this example, the input ports of router 102 include a first input port set connected to the outputs of the processing element 101 and a second input port set 202 connected to the outputs of adjacent routers. According to the current example, four input ports North (N), East (E), West (W), and South (S) of the second input port set 202 represent inputs in four directions.

The output ports of router 102 include a first output port set 203 connected to the inputs of the processing element 101 and a second output port set 204 connected to the inputs of adjacent routers. In this example, four output ports N, E, W, and S of the second output port set 204 represent outputs in four directions.

As an example, referring to FIGS. 1 and 2, router 102 may correspond to router #9 (102j) shown in FIG. 1. In this example, the N input port of router #9 (102j) may receive data from an output port of router #5 (102f), the E input port may receive data from an output port of router #10 (102k), the W input port may receive data from an output port of router #8 (102i), and the S input port may receive data from an output port of router #13 (102n).

Referring again to FIG. 1, router 102 may receive data from one of the six input ports RF, DST, N, E, W, and S. For example, data may be input to the input port DST connected to the output of the function unit 210. In this example, router 102 which has received the data selects one of the output ports RF, SRC0, SRC1, N, E, W, and S, and transfer the data through the selected output port. Router 102 may determine an output port based on received compile information 205. The compile information is configuration information which may be generated during compiling and which may be defined in advance, for example, in a separate memory and the like.

Figure 3:
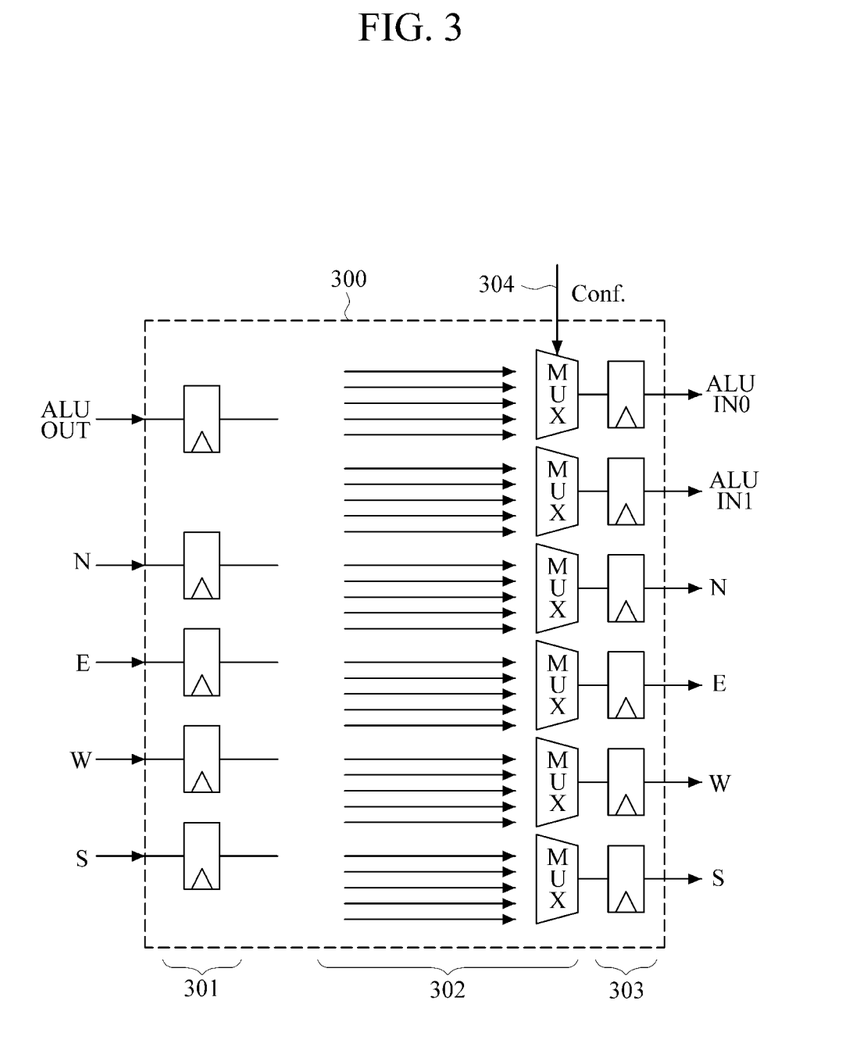
FIG. 3 is a diagram illustrating an example of a router.

FIG. 3 illustrates an example of a router 300. Referring to FIG. 3, router 300 includes an input unit 301, a determining unit 302, and an output unit 303.

The input unit 301 may receive data from a processing element that is connected to the router 300 or from an adjacent router. The determining unit 302 may determine an output direction of the data based on compile information 304. The output unit 303 may output the data to a processing element or to an adjacent router based on the determined output direction.

According to an aspect, the determining unit 302 may include a plurality of multiplexers (MUXs). Each MUX may correspond to an output port of the output unit 303. For example, if the router 300 has 6 output directions or 6 output ports, 6 MUXs may be included. In the example of FIG. 3, the inputs of each MUX correspond to the input ports of the router 300. In this example, the router 300 has 5 input ports, accordingly each MUX has 5 inputs. Each MUX may determine an output according to the compile information 304.

For example, data may be received by the input port N and the data may be output to the output port S. The data received by the input port N is transferred to the individual MUXs. In this example, based on the compile information 304, the remaining MUXs except for the MUX connected to the output port S are inactivated. Accordingly, the data input to the input port N can be output to the output port S without referring to separate header information and/or a routing table.

In the example of FIG. 3, the determining unit 302 is comprised of MUXs, however, the configuration of the determining unit 302 is not limited to this. For example, the determining unit 302 may be a network switch that selects one from among a plurality of paths according to predetermined compile information.

Also, FIG. 3 illustrates an example in which both the input unit 301 and output unit 303 have buffers, however, it should be also apparent that the arrangement of buffers may be variously changed, for example, based on applications, timing constraints, and the like.

Figure 4A:
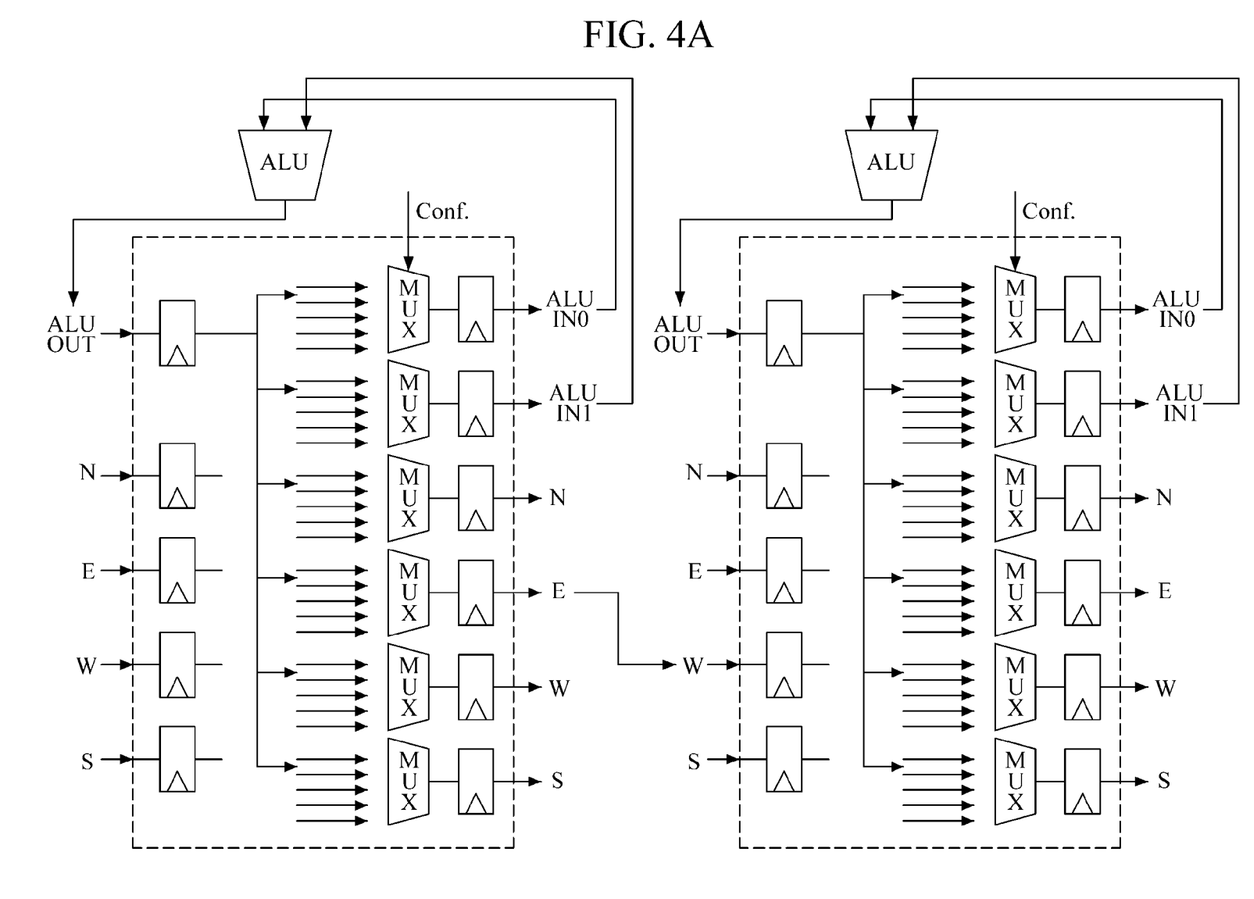
FIGS. 4A through 4C are diagrams illustrating examples of the arrangement of buffers.
Figure 4B:
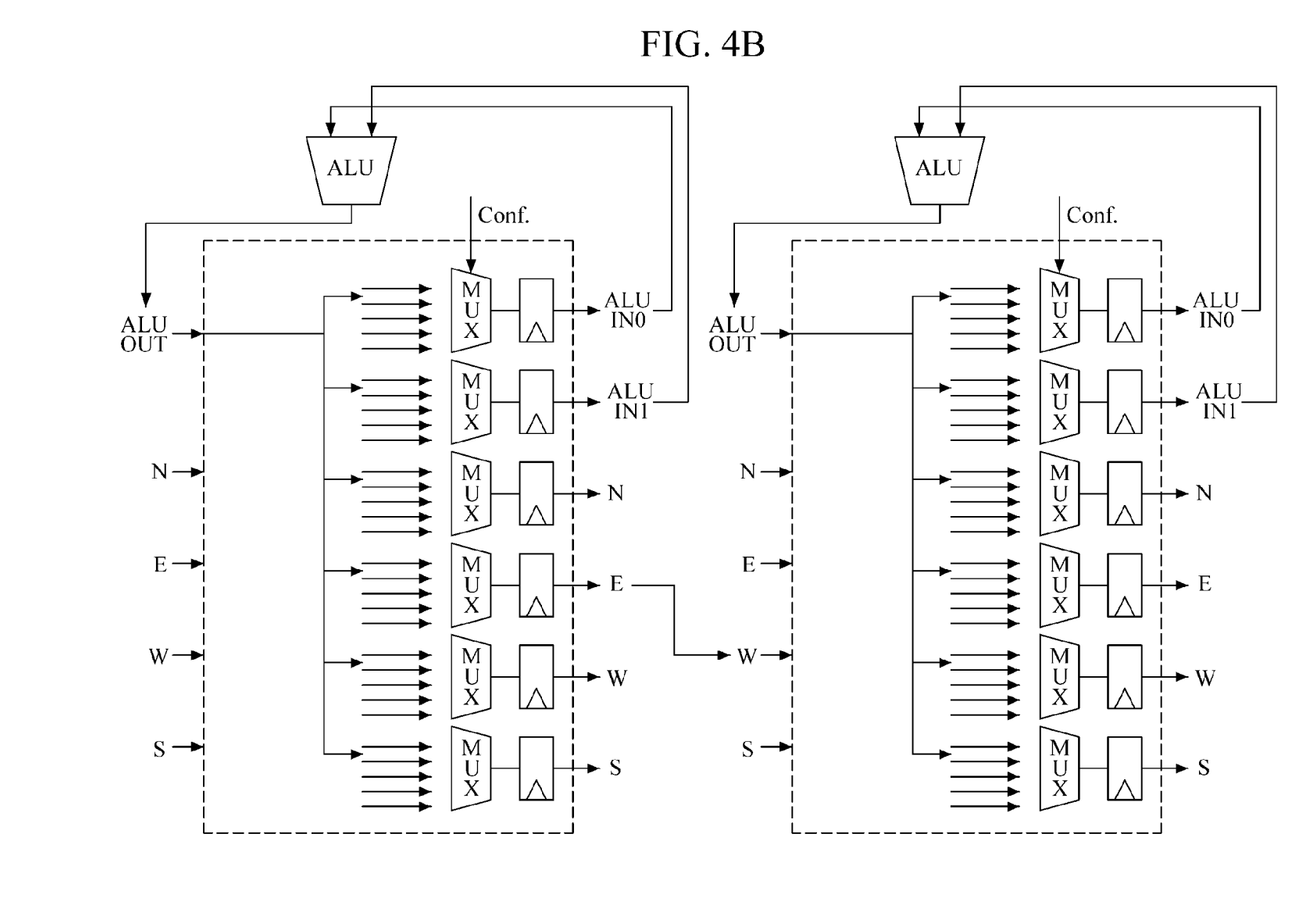
Figure 4C:
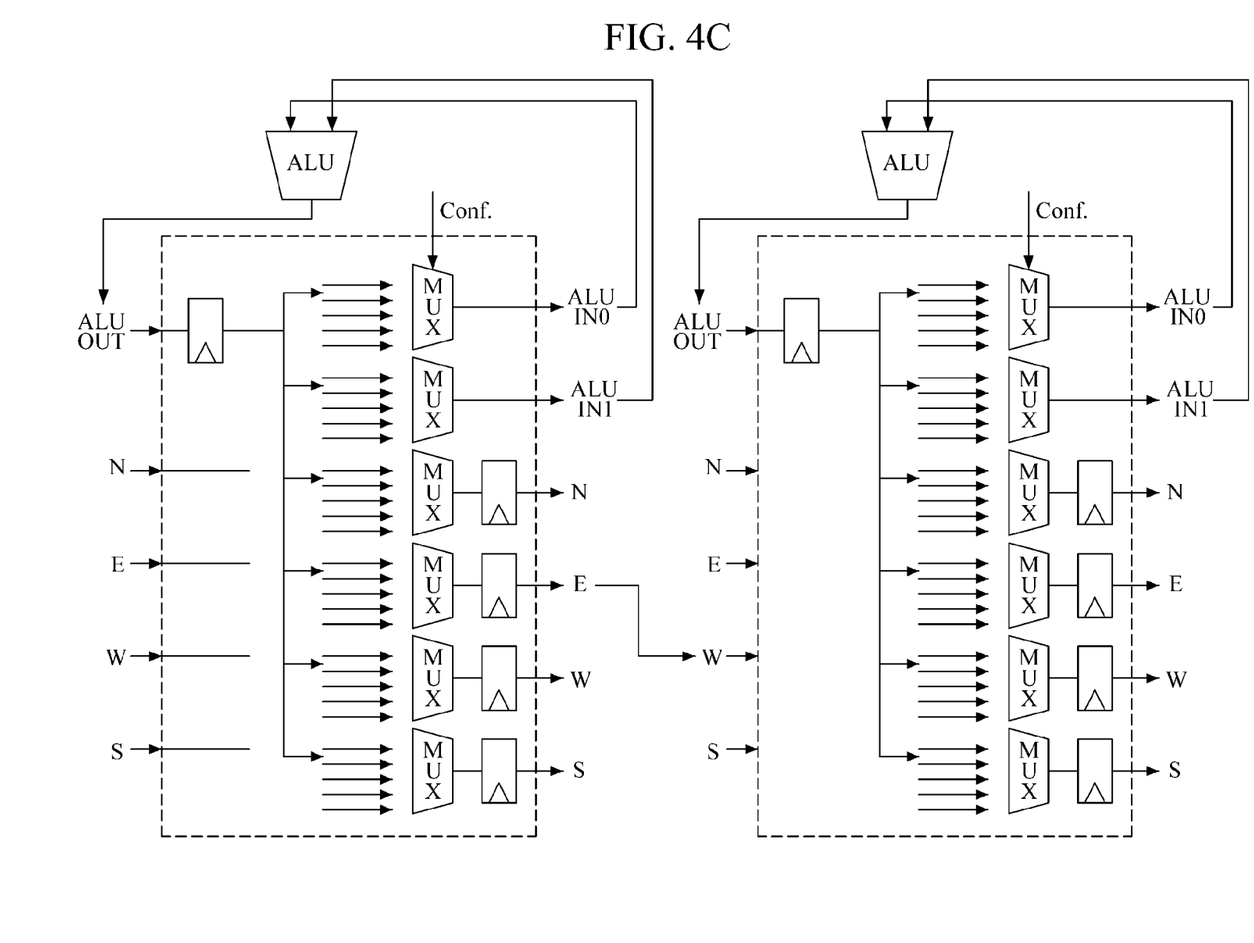

FIGS. 4A through 4C illustrate arrangement examples of buffers.

In the example of FIG. 4A, buffers are provided at input terminals and at output terminals of a router. In this example buffer arrangement, input terminals of a router consume 1 cycle upon transfer of data and output terminals of a router consume 1 cycle upon transfer of data.

In the example of FIG. 4B, buffers are provided only at output terminals of a router. In this example buffer arrangement, the output terminals of a router consume 1 cycle upon transfer of data.

Further, in the example of FIG. 4C, a buffer is provided only at an input terminal connected to a processing element and the remaining buffers are provided at the output terminals of a router.

FIGS. 4A-4C are merely for purposes of example. In addition to the examples of FIGS. 4A, 4B, and 4C, the arrangement of buffers or registers in a router may be variously changed, for example, according to system performance, system capacity, timing constraints, and the like.

Figure 5:
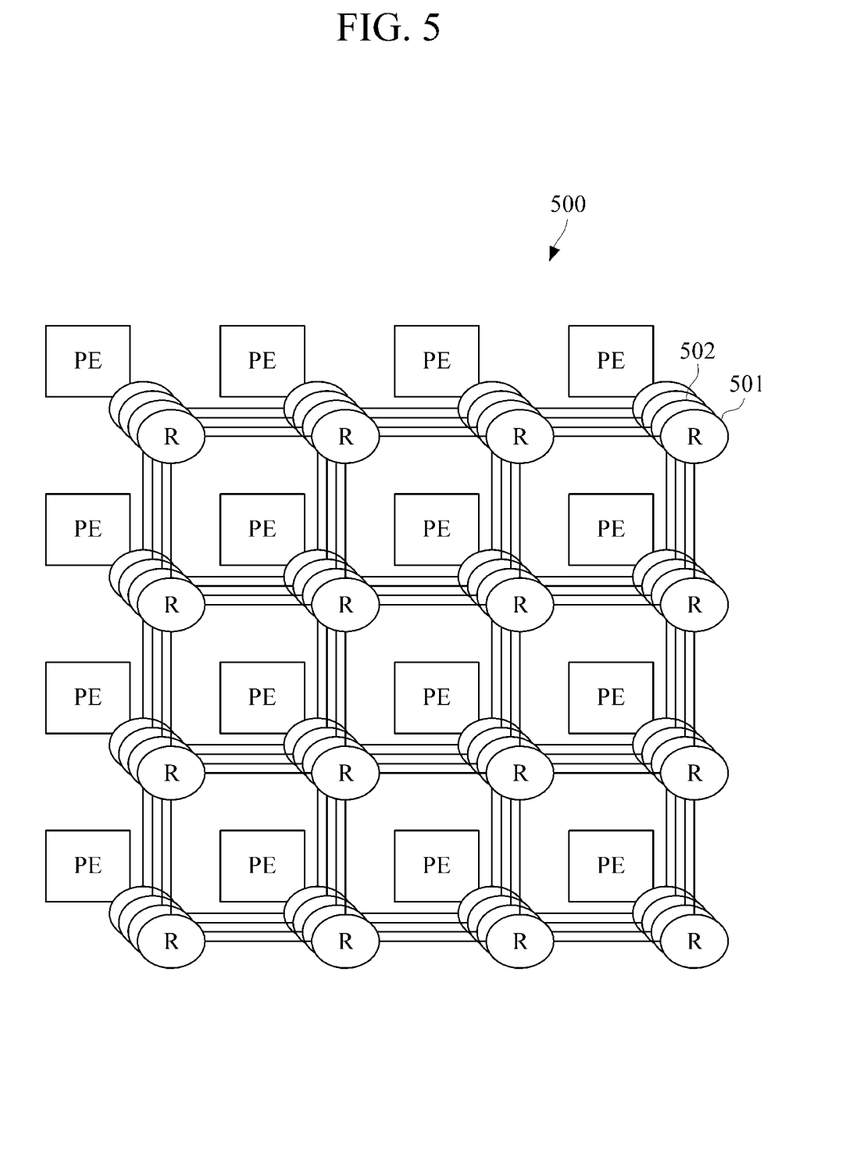
FIG. 5 is a diagram illustrating another example of a CGRA.

FIG. 5 illustrates another example of a CGRA 500. The CGRA 500 includes a plurality of processing elements PE, a first network 501, and a second network 502.

Referring to FIG. 5, the first network 501 includes a plurality of routers R that are respectively connected to the processing elements PE and a plurality of links for connecting the routers R. For example, the configuration of the first network 501 is substantially the same as the configuration of the routers and links as described above with reference to FIGS. 1 through 4.

The second network 502 also includes a plurality of routers R respectively connected to the processing elements PE and a plurality of links for connecting the routers R. For example, the physical configuration of the second network 502 may be the same as that of the first network 501.

In the example of FIG. 5, the second network 502 is configured independently from the first network 501. Accordingly, a processing element PE may transfer data through the first network 501 or through the second network 502. For example, a processing element may transfer data through the first network 501, and a processing element may simultaneously transfer data through the second network 502. The processing element may be the same processing element or different processing elements.

In other words, in a CGRA (for example, 100 of FIG. 1) according to an example, each processing element performs communication through shared channels connected by routers. However, there may occur a case in which data cannot be transferred through some channels because the channels are being used. In order to reduce collision, a plurality of networks may be configured in parallel so that a plurality of pieces of data can be simultaneously transferred in the same direction.

According to various aspects, because static routers are used to transfer data between processing elements in a CGRA, the processing elements may be used only for operation while not participating in transferring data. Accordingly, overhead due to data transfer of processing elements may be reduced, and system performance may be enhanced. Also, because only the channels used to transfer data consume power, energy efficiency may be improved.

According to various aspects, because a connection structure between processing elements and routers and the structure of each router are simple, the design of a CGRA may be simplified and excellent scalability may be achieved.

According to various aspects, because networks between processing elements are configured through compile information and a simple switching structure without the use of a header for routing or a routing table, network throughput may be increased.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

As a non-exhaustive illustration only, a terminal/device/unit described herein may refer to mobile devices such as a cellular phone, a personal digital assistant (PDA), a digital camera, a portable game console, and an MP3 player, a portable/personal multimedia player (PMP), a handheld e-book, a portable laptop PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer. It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A reconfigurable processor comprising:
   processing elements;
   routers respectively connected to the processing elements; and
   connection links formed between the routers,
   wherein one of the routers is configured to determine an output direction of data based on predefined configuration information, and the predefined configuration information comprises information about a location to which a result of an operation is to be transferred.

2. The reconfigurable processor of claim 1, wherein the reconfigurable processor comprises a Coarse Grain Reconfigurable Array(CGRA).

3. The reconfigurable processor of claim 1, wherein the predefined configuration information further comprises compile information.

4. The reconfigurable processor of claim 1, wherein each processing element comprises:
   a function unit configured to perform an arithmetic and/or a logic operation; and a register file configured to store data associated with the arithmetic and/or logic operation.

5. The reconfigurable processor of claim 1, wherein each router receives data from a respective processing element directly connected to the router or from an adjacent router, and transfers the data to the respective processing element or the adjacent router based on compile information.

6. The reconfigurable processor of claim 1,
   wherein each router comprises:
   a receiver configured to receive data from a processing element and from an adjacent router;
   a determining unit configured to determine an output direction of the received data based on the predefined configuration information; and
   an output unit configured to output the data to the processing element or adjacent router based on the determined output direction.

7. The reconfigurable processor of claim 6, wherein the determining unit comprises a plurality of multiplexers (MUXs) that are scheduled based on the predefined information.

8. The reconfigurable processor of claim 7, wherein a number of the MUXs is the same as a number of output directions of the router.

9. The reconfigurable processor claim 6, wherein the determining unit comprises a network switch to select the output direction based on the predefined configuration information.

10. The reconfigurable processor of claim 1, wherein the routers are configured to simultaneously transmit the data between at least two processing elements.

11. A reconfigurable processor comprising:
processing elements;
a first network comprising first routers respectively connected to the plurality of processing elements and first connection links through which the first routers are connected; and
a second network formed independently from the first network and comprising second routers respectively connected to the processing elements and second connection links through which the second routers are connected.

12. The reconfigurable processor of claim 11, wherein each processing element comprises:
a function unit configured to perform an arithmetic and/or a logic operation; and
a register file configured to store data related to the arithmetic and/or logic operation.

13. The reconfigurable processor of claim 11, wherein at least one of a first router and a second router receives data from a respective processing element connected thereto or from an adjacent router, and transmits the received data to the processing element or to another adjacent router based on compile information.

14. The reconfigurable processor of claim 11, wherein each of the first plurality of routers and the second plurality of routers comprises:
a receiver configured to receive data from a respective processing element and from an adjacent router;
a determining unit configured to determine an output direction of the received data based on configuration information; and
an output unit configured to output the received data to the respective processing element or to the other adjacent router based on the determined output direction.

15. The reconfigurable processor of claim 14, wherein the determining unit comprises multiplexers that are scheduled based on the configuration information.

16. The reconfigurable processor of claim 15, wherein a number of the multiplexers for each of the first routers and the second routers is the same as a number of output directions of data for each respective router.

17. The reconfigurable processor of claim 11, wherein the first network of routers and the second network of routers are configured to simultaneously transmit data between at least two processing elements.

* * * * *